United States Patent [19]

Stefanopoulou et al.

[11] Patent Number: 5,755,202
[45] Date of Patent: May 26, 1998

[54] METHOD OF REDUCING FEED GAS EMISSIONS IN AN INTERNAL COMBUSTION ENGINE

[75] Inventors: Anna Stefanopoulou, Ann Harbor; Kenneth Roy Butts, Grosse Pointe Woods, both of Mich.

[73] Assignee: Ford Global Technologies, Inc., Dearborn, Mich.

[21] Appl. No.: 738,197

[22] Filed: Oct. 25, 1996

[51] Int. Cl.$^6$ ........................................... F02D 7/00
[52] U.S. Cl. .................................................. 123/399
[58] Field of Search .................... 123/399, 395, 123/369, 416, 417

[56] References Cited

U.S. PATENT DOCUMENTS

| | | | |
|---|---|---|---|
| 5,161,507 | 11/1992 | Terazawa et al. | 123/399 |
| 5,215,057 | 6/1993 | Sato et al. | 123/400 |
| 5,233,958 | 8/1993 | Knoss et al. | 123/396 |
| 5,241,936 | 9/1993 | Byler et al. | 123/399 |
| 5,259,349 | 11/1993 | Radlinski | 123/399 |
| 5,349,932 | 9/1994 | Boverie et al. | 123/399 |

FOREIGN PATENT DOCUMENTS

| | | | |
|---|---|---|---|
| 03124909 | 5/1991 | Japan | 123/399 |
| 05231136 | 9/1993 | Japan | 123/399 |
| 05231137 | 9/1993 | Japan | 123/399 |
| 05231138 | 9/1993 | Japan | 123/399 |
| 05312026 | 11/1993 | Japan | 123/399 |
| 06093845 | 4/1994 | Japan | 123/399 |
| 06330741 | 11/1994 | Japan | 123/399 |
| 07071234 | 3/1995 | Japan | 123/399 |
| 07293233 | 11/1995 | Japan | 123/399 |
| 07305644 | 11/1995 | Japan | 123/399 |
| 07310534 | 11/1995 | Japan | 123/399 |
| 08004522 | 1/1996 | Japan | 123/399 |
| 08061052 | 3/1996 | Japan | 123/399 |
| 08100639 | 4/1996 | Japan | 123/399 |
| 08105318 | 4/1996 | Japan | 123/399 |
| 08121147 | 5/1996 | Japan | 123/399 |

OTHER PUBLICATIONS

"Development of a Variable Valve Timed Engine to Eliminate the Pumping Losses Associated with Throttle Operation", by Alvon C. Elrod et al, SAE Paper #860537, 1986, 8 pgs.

"Associated Valve Timing—A Possibility to Control Engine Load without Throttle", by Hans Peter Lenz et al, SAE Paper #880388, 1988, 7 pgs.

(List continued on next page.)

Primary Examiner—Raymond A. Nelli
Attorney, Agent, or Firm—Peter Abolins; Roger L. May

[57] ABSTRACT

A method of reducing feed gas emissions and improving fuel economy in an internal combustion engine uses a variable cam timing mechanism and an electronically controlled throttle. The method includes: a) predetermining ranges of negligible torque demand, small torque demand, moderate torque demand, high torque demand and maximum torque demand; b) determining actual torque demand; c) using conventional cam phasing and pedal-to-throttle relationship if actual torque demand corresponds with the negligible torque demand range; d) using cam phasing of magnitude in transition between conventional and fully retarded cam phasing and retaining conventional pedal-to-throttle relationship if actual torque demand corresponds with the small torque demand range; e) using fully retarded cam phasing and electronically adjusting throttle position to meet actual torque demand if actual torque demand corresponds with the moderate torque demand range; f) using cam phasing of magnitude in transition between fully retarded and conventional cam phasing and holding throttle position constant if actual torque corresponds with the high torque demand range; and g) using conventional cam phasing and pedal-to-throttle relationship if actual torque corresponds with the maximum torque demand range. Similar schemes are provided for intake advance and exhaust retard strategies.

6 Claims, 10 Drawing Sheets

OTHER PUBLICATIONS

"A Review Of Vaiable Engine Valve Timing", by C. Gray, SAE Paper #880386, 9 pgs.

"Effect of Variable Engine Valve Timing on Fuel Economy", by T. H. Ma, SAE Paper #880390, 1988, 8 pgs.

"Comparison of Variable Camshaft Timing Strategies at Part Load", by T. G. Leone et al, SAE Technical Paper #960584, International Congress & Exposition, Detroit, Michigan, Feb. 26–29, 1996, pp. 49–67.

"Variable Cam Timing as an Emission Control Tool", by G. B. Kirby Meacham, SAE Paper, 20 pgs.

"Consequences of Modular Controller Development for Automotive Powertrains: A Case Study", by A. G. Stephanopoulou et al, 6 pgs.

"Modeling and Control of a Spark Ignition Engine with Variable Cam Timing", A. G. Stephanopoulou et al, 6 pgs.

"Dual Equal VCT—A Variable Camshaft Timing Strategy for Improved Fuel Economy and Emissions", by R. A. Stein et al, SAE Paper #950975, 13 pgs.

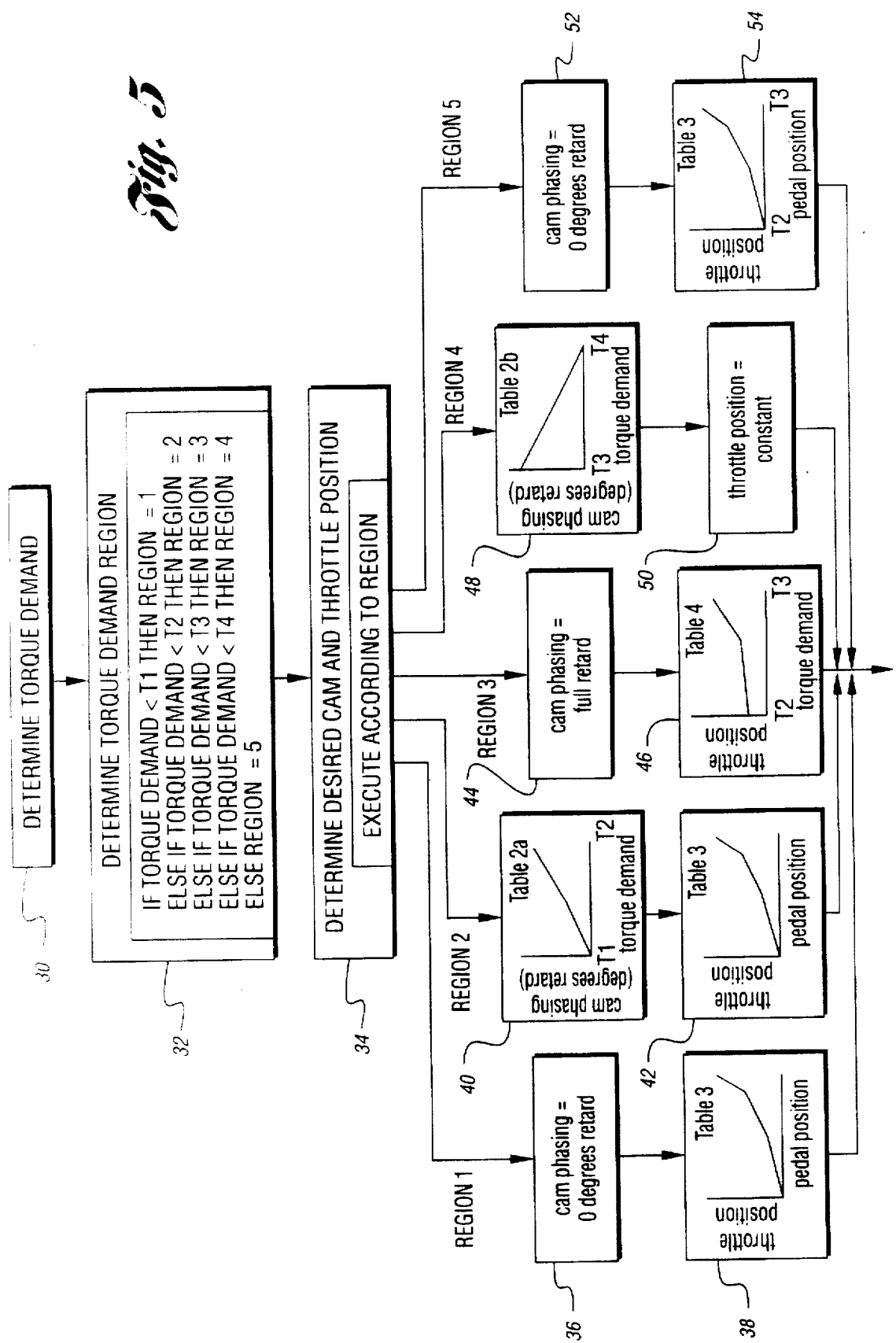

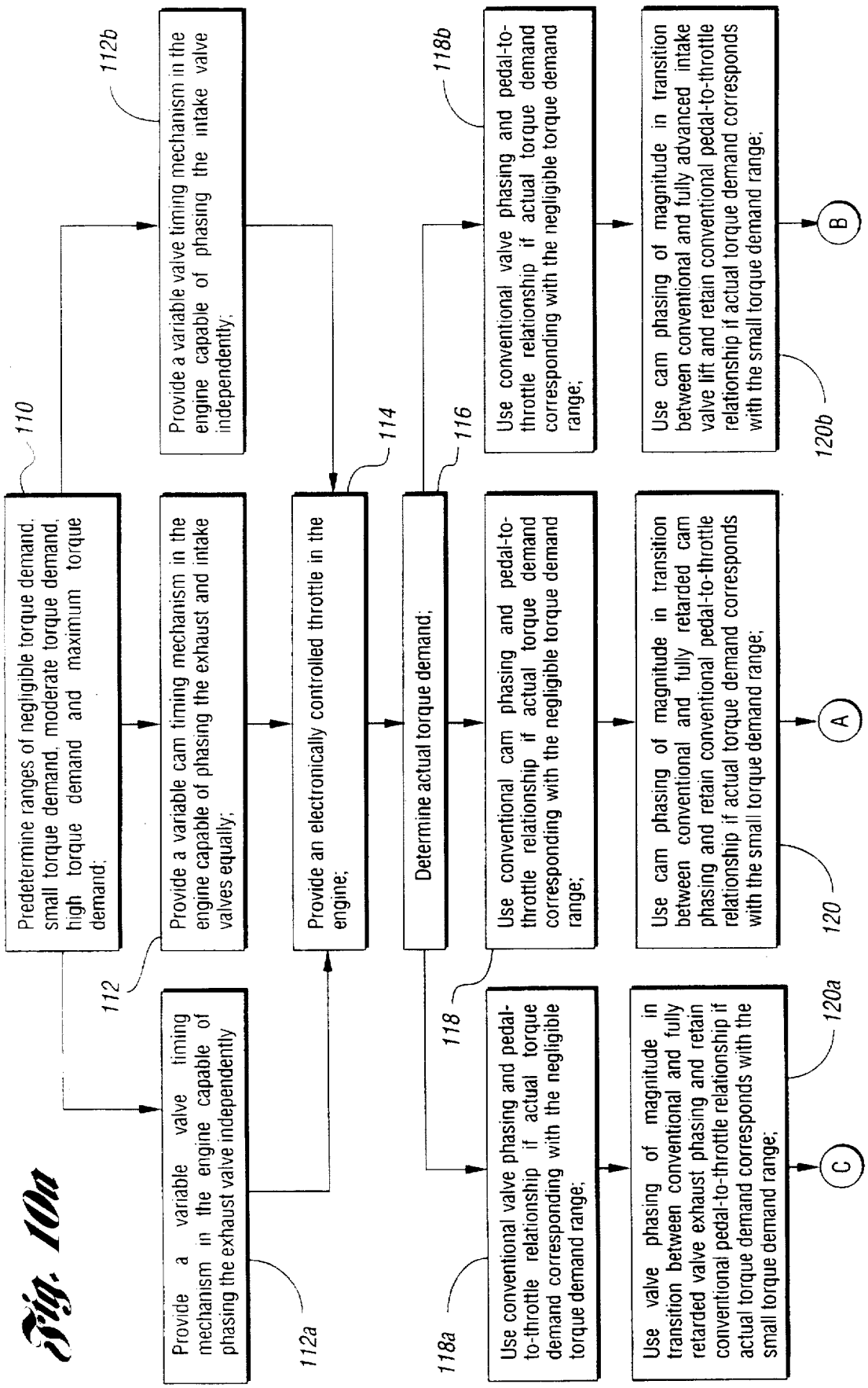

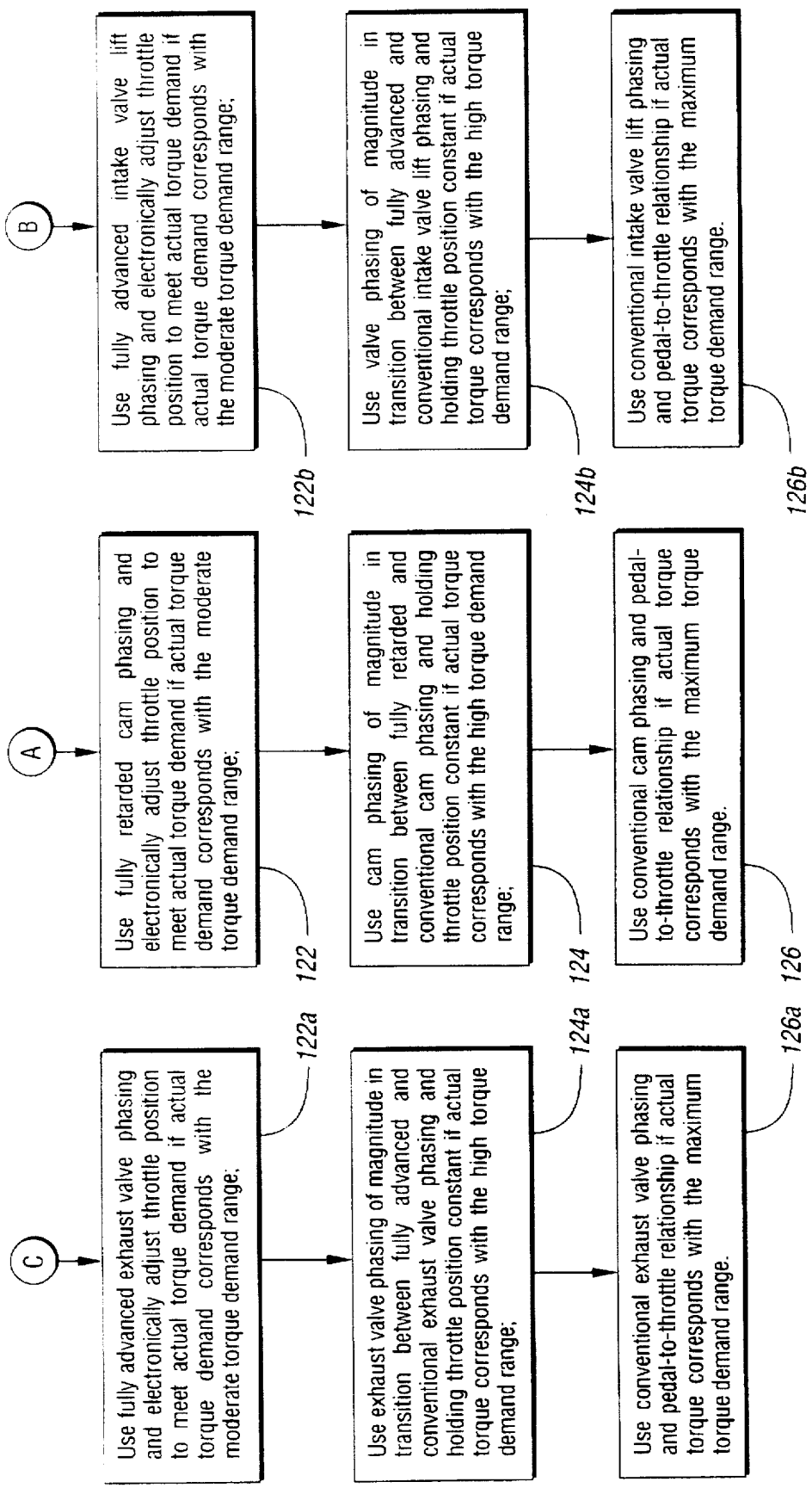

METHOD OF REDUCING FEED GAS EMISSIONS IN AN INTERNAL COMBUSTION ENGINE

TECHNICAL FIELD

The present invention relates to a method of reducing feed gas emissions and improving fuel economy in an internal combustion and, more particularly, to a method which provides an optimal non-linear scheme of scheduling camshaft phasing and throttle position in an internal combustion spark ignited engine equipped with a variable camshaft timing mechanism and electronic throttle control.

BACKGROUND Of THE INVENTION

Variable cam timing (VCT) is a promising feature for automotive engines because it allows optimization of the cam timing over a wide range of engine operating conditions. Investigation of variable cam timing schemes shows potential benefits in fuel economy, reduced feed gas emissions, and improved full load performance. The VCT mechanism enables the rotation of the camshaft relative to the crankshaft. As a result, the exhaust and intake valve timing can be optimized to improve overall engine performance. There are four variable cam timing strategies in dual overhead cam engines: 1) phasing only the intake cam (intake-only); 2) phasing the exhaust cam only (exhaust-only); 3) phasing the exhaust and intake cam equally (dual-equal, which can also be used with a single overhead cam engine); and 4) phasing the exhaust and the intake cam independently (dual-independent). As an example of the variable cam timing strategies, the dual-equal VCT scheme is illustrated in FIGS. 1–5.

Referring to FIGS. 1a–1b and 2a–2d, an example of a variable cam timing engine is illustrated. By retarding the cam phasing, the exhaust valve stays open during the intake event for a longer period of time. This causes the induction and reburn of the last part of the exhaust gases which is rich in unburned HC. The resulting diluent, also, lowers the combustion temperature and suppresses feed gas $NO_x$ emissions. The amount of reduction will vary with engine speed and load.

As shown in FIG. 1b, the exhaust and inlet curves 10,12 are shifted an equal amount R (i.e. cam retarding). Accordingly, when the piston 14 moves within the cylinder 16 during the exhaust stroke, the inlet valve 18 is closed and the outlet valve 20 is opened (see FIG. 2a). The piston 14 then reverses its direction and begins to draw air in past the intake valve 18, and the exhaust valve 20 remains open for a brief period of time (see FIG. 2c) such that the last part of the exhaust gases are drawn back into the cylinder 16 from the exhaust manifold. The exhaust valve 20 then closes and intake is continued (see FIG. 2d).

Cam timing can increase internal residual and consequently affect the combustion and exhaust process. Internal residual reduces the combustion temperature and suppresses $NO_x$ formation. The exhaust gas that is drawn back into the cylinder, as illustrated in FIG. 2c, is rich in unburned HC. As a result, variable cam timing is used to reduce the base HC and $NO_x$ feed gas emission levels of the engine with respect to a conventional power plant (using fixed cam phasing). It also obviates the requirement for external exhaust gas recirculation systems commonly used for $NO_x$ reduction. The dilution of the in-cylinder mixture, however, alters the engine torque response and restrains the usage of cam retard to part throttle engine operating condition. This limitation can be crucial for the viability of the VCT engine under stringent emission requirements. The variable cam timing schemes affect the breathing process and require operation in higher manifold pressure to meet driver torque demand, which results in reduction in pumping losses and therefore increases fuel economy.

On an engine equipped with a variable cam timing mechanism and the conventional mechanical throttle (MT), the cam phasing is scheduled based on throttle position or inferred torque. In this case, the steady state torque response is a function of throttle position, cam timing, and engine speed. Throttle position has a fixed relationship with pedal position on an engine with mechanical throttle. The optimum steady state cam phasing that minimizes emissions is scheduled: 1) near idle, it is scheduled for idle stability which requires advanced cam phasing; 2) at mid throttle, it is scheduled for emissions which favors fully retarded cam phasing (relative to conventional cam timing) for the exhaust only and the dual-equal schemes, and fully advanced cam timing for the intake only scheme; and 3) at wide open throttle, it is scheduled for maximum torque which requires cam phasing equal to standard cam timing.

Variable cam timing schemes which are optimized for emissions improvement are known to reduce maximum engine torque. The dual-equal cam retard results in the most severe reductions in engine torque.

FIG. 3a shows an example of the previously explained cam phasing scheduling scheme for a constant engine speed and for an engine equipped with the dual-equal VCT mechanism. The optimum scheduling scheme illustrated in FIG. 3a cannot be implemented, however, because it introduces torque discontinuities which might entail driveability issues and possibly large air/fuel ratio excursions, which, in turn, might adversely affect the tailpipe emissions. In practice, the cam scheduling scheme for an engine with mechanical throttle trades increased feed gas emissions (reduced air charge at retarded cam) for smooth torque response. An example of this type of cam scheduling scheme is shown in FIG. 3b. Similar cam timing scheduling schemes are necessary for the other three variable cam timing schemes (intake only, exhaust only, and dual independent).

This scheduling scheme has two deficiencies: 1) the cam phasing scheduling scheme is conservative, i.e. cam phasing is used over a small region of the engine operating regime); and 2) the steady state torque response during middle throttle is not the same as the steady state torque response of the conventional engine. The first deficiency might be crucial to the emissions reduction that the VCT engine can achieve, and consequently mitigate the potential benefits of the VCT engine when compared with the conventional EGR system. The second deficiency is less crucial, as long as the driver can obtain the desired torque by adjusting the pedal position.

It is desirable to use a variable cam timing mechanism optimally in reducing feed gas emissions and improving fuel economy without loss of torque.

DISCLOSURE OF THE INVENTION

The present invention overcomes the above-references shortcomings of prior art methods by combining electronic throttle control with variable cam timing to allow integrated scheduling of the throttle position and the cam phasing based on pedal position. This new scheduling scheme significantly expands the usage of retarded cam phasing over a large operating regime of the engine, thus reducing feed gas emissions, and it ensures tracking of the estimated torque demand based on pedal position measurements.

Furthermore, the scheme allows operation at larger throttle openings (under higher manifold pressure), which may increase fuel economy due to the reduction of pumping losses.

More specifically, the present invention provides a method of reducing feed gas emissions and improving fuel economy in an internal combustion engine comprising: a) predetermining ranges of negligible torque demand, small torque demand, moderate torque demand, high torque demand and maximum torque demand; b) providing a variable cam timing mechanism in the engine capable of phasing the exhaust and intake valves equally; c) providing an electronically controlled throttle in the engine; d) determining actual torque demand; e) using the conventional cam phasing and pedal-to-throttle relationship if actual torque demand corresponds with the negligible torque demand range; f) using cam phasing of magnitude in transition between conventional and fully retarded cam phasing and retaining conventional pedal-to-throttle relationship if actual torque demand corresponds with the small torque demand range; g) using fully retarded cam phasing and electronically adjusting throttle position to meet actual torque demand if actual torque demand corresponds with the moderate torque demand range; h) using cam phasing of magnitude in transition between fully retarded and conventional cam phasing and holding throttle position constant if actual torque demand corresponds with the high torque demand range; and i) using conventional cam phasing and pedal-to-throttle relationship if actual torque demand corresponds with the maximum torque demand range. The above method is described with reference to a dual-equal VCT strategy. By substituting "retarded" with "advanced," the above cam timing scheduling scheme would apply to an intake-only VCT strategy, and by substituting "retarded" with "exhaust-retarded," the above cam timing scheduling scheme is applicable to an exhaust-only VCT strategy. By combining the two, a dual-independent strategy is achieved.

Accordingly, an object of the present invention is to provide a method of reducing feed gas emissions and improving fuel economy in an internal combustion engine by combining a variable cam timing mechanism with electronic throttle control, thereby expanding usage of retarded cam phasing to improve feed gas emissions, and ensuring tracking of the estimated torque demand based upon pedal position.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 shows a flow diagram of a method of reducing feed gas emissions and improving fuel economy in accordance with the present invention;

FIGS. 10a and b show a flow chart illustrating the preferred methods of the present invention.

DETAILED DESCRIPTION OF THE PREFERRED EMBODIMENTS

Figure 1A:
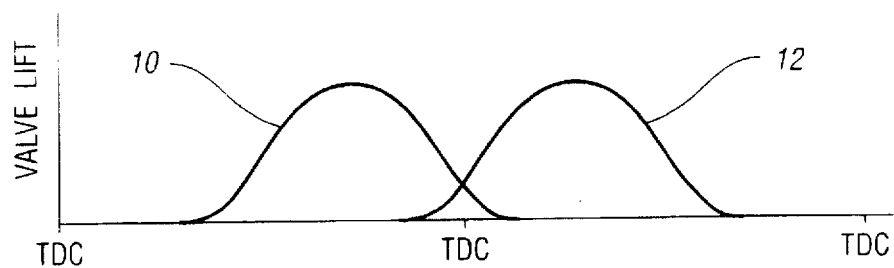
FIG. 1a graphically illustrates a conventional cam timing scheme.
Figure 1B:
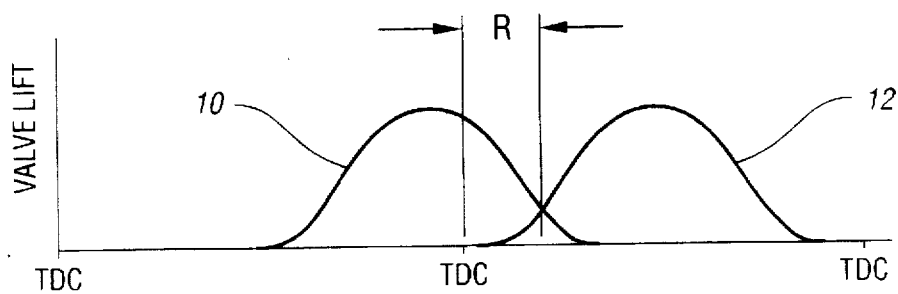
FIG. 1b graphically illustrates a retarded cam timing scheme.
Figure 3A:
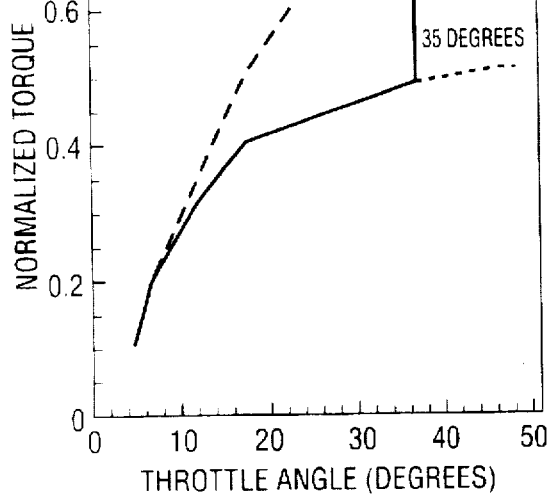
FIG. 3a graphically illustrates an optimum cam phasing scheduling scheme for an engine equipped with a dual-equal VCT mechanism and operating at a constant engine speed.
Figure 3B:
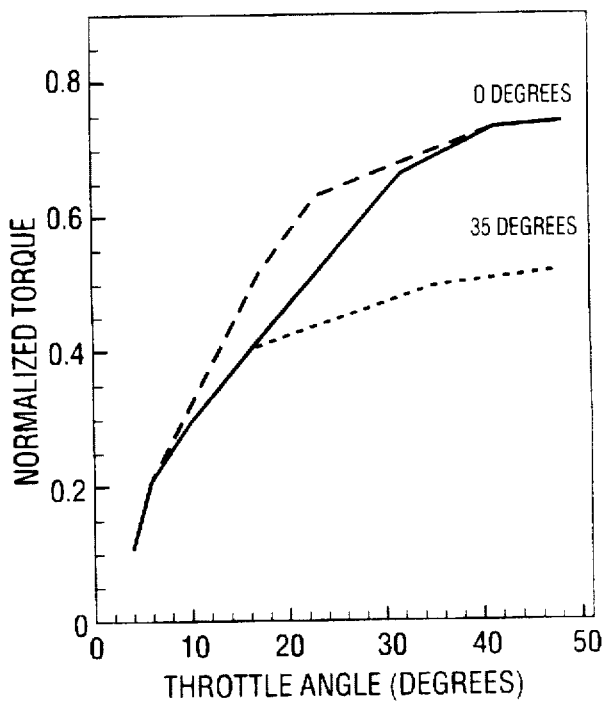
FIG. 3b graphically illustrates a cam scheduling scheme for an engine with a mechanically controlled throttle and a dual-equal VCT mechanism.
Figure 2A:
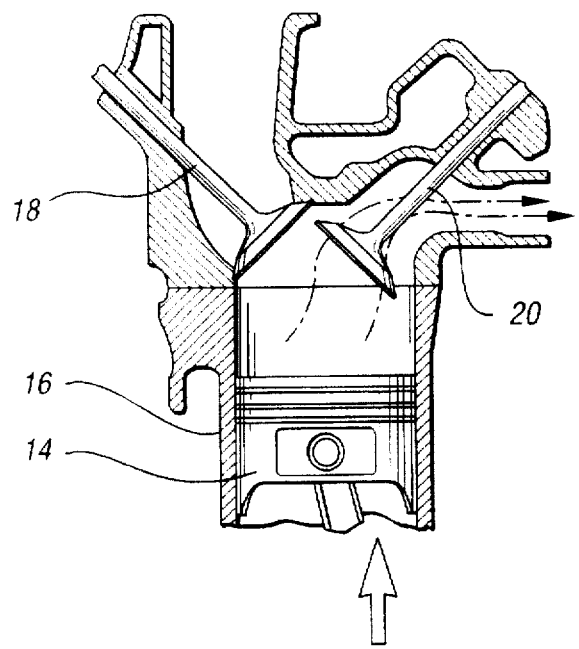
FIG. 2a shows a vertical cross-sectional view of an engine cylinder illustrating an exhaust stroke.
Figures 2B, 2C:
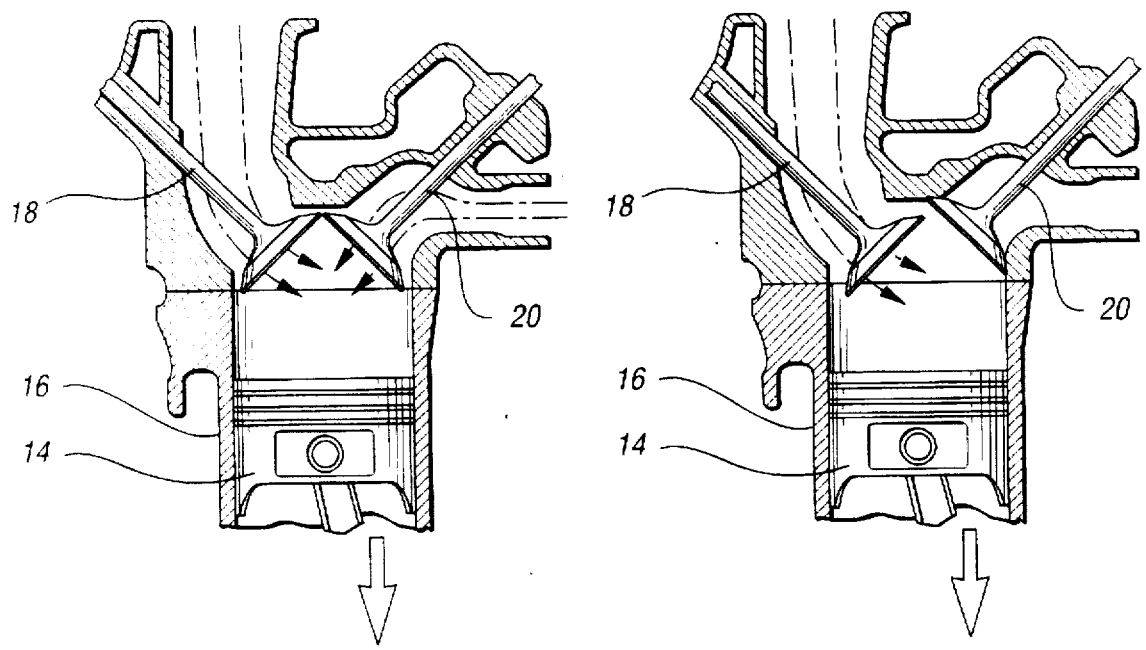
FIG. 2b shows a vertical cross-sectional view of an engine cylinder illustrating retarded exhaust and inlet valve behavior.
FIG. 2c shows a vertical cross-section of an engine cylinder illustrating an intake piston stroke.
Figure 4:
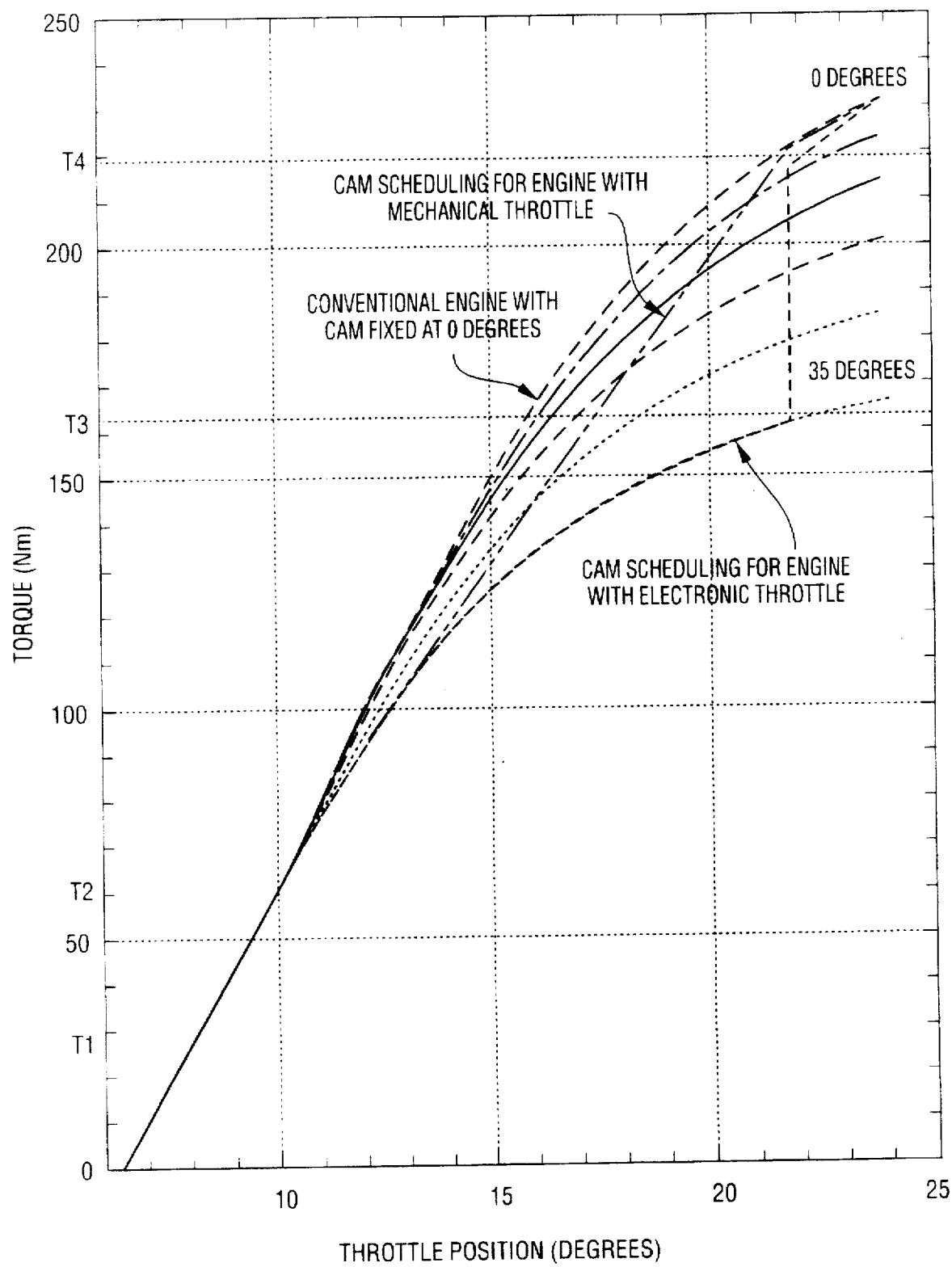
FIG. 4 graphically illustrates torque versus throttle position for a cam scheduling scheme in accordance with the present invention.

The steady state cam phasing and throttle position for the dual-equal VCT strategy is shown in FIG. 4 in accordance with the present invention and is represented by the dashed line marked "cam scheduling for engine with electronic throttle". Note that this scheme is identical to the optimum scheme that minimizes feed gas emissions in FIG. 3a. Similar optimal trajectories can be obtained for the exhaust only and the intake only VCT strategies. For simplicity, we illustrate the throttle angle and the cam retard scheduling scheme for the dual-equal VCT strategy. In the following scheme, if we substitute cam "retarded" with "intake advance," we can obtain the invented cam timing scheduling scheme for the intake only VCT strategy, and if we substitute cam "retarded" with "exhaust retard," we can obtain the invented cam timing scheduling scheme for the exhaust only VCT strategy. FIGS. 10a and b illustrate the method steps of the present invention in steps 110 through 126. Items 112a, 118a, 120a, 122a, 124a and 126a illustrate an exhaust-retard alternative, and items 112b, 118b, 120b, 122b, 124b, and 126b illustrate the intake-advance alternative. Of course, the two could be combined to create a dual-independent scheme.

In the scheduling scheme in accordance with the present invention, the accelerator pedal position is interpreted as driver torque demand in a dual-equal VCT strategy. This torque demand is then divided into five regions which govern the cam and throttle position scheduling rules as outlined below.

Region 1 (from Torque=0 to T1 in FIG. 4) is the negligible torque demand region. In this region, we use conventional cam phasing and conventional pedal-to-throttle relationship. This region is needed to ensure that the system behaves conventionally at the closed accelerator pedal position and that combustion stability is maintained at idle.

Region 2 is the small torque demand region (from T1 to T2 in FIG. 4). Transition from conventional to fully retarded cam phasing occurs in this region while retaining a conventional pedal-to-throttle relationship. This region reduces cam scheduling sensitivity to small changes in off-idle acceleration pedal position.

Region 3 (from T2 to T3 in FIG. 4) is the moderate torque demand region. In this region, fully retarded cam phasing is used, and throttle position is adjusted in order to meet the torque demand. The full benefits of variable cam timing and electronic throttle control are realized in this region.

Region 4 (from T3 to T4 in FIG. 4) is the high torque demand region. In this region, the transition is made from fully retarded to conventional cam phasing to meet torque demand, and throttle position is held constant. This is the region in which the cam scheduling must be relaxed to meet torque demand.

Region 5 (above T4 in FIG. 4) is the maximum torque demand region. In this region, the scheme reverts to conventional cam phasing and to the conventional pedal-to-throttle relationship. This region ensures that driver torque demands are satisfied by the system.

The algorithm can be implemented in real-time embedded controller applications according to the flow chart presented in FIG. 5. To simplify the presentation, all characterization tables are shown with a single input dimension. However, in practice, engine speed is used as a second input dimension to ensure proper scheduling over the entire operating envelope.

According to the scheme illustrated in FIG. 5, the first step (step 30) is to determine the torque demand. This determination is tuned to match the desired vehicle characteristic for conventional cam timing. The next step (step 32) is to determine the torque demand region. T1, T2, T3, and T4 are determined by the engine characteristics and desired vehicle characteristics. Step 34 is to determine the desired cam and throttle commands according to the region of operation. In region 1 (step 36), cam phasing is set to zero, and the conventional pedal-to-throttle relationship is used (step 38). In region 2, the transition is made from base to fully retarded cam phasing (step 40), and the conventional pedal-to-throttle relationship is maintained (step 42). In region 3, the cam phasing is scheduled as fully retarded (step 44), and the throttle position is adjusted to meet torque demand (step 46).

In region 4, the transition is made from fully retarded to conventional cam phasing to meet torque demand (step 48), and the throttle position is held constant (step 50). The throttle position is determined by the engine characteristic. In region 5, the cam phasing is reverted to 0 degrees retard (step 52), and the conventional pedal-to-throttle relationship is re-established (step 54).

Figure 6A:
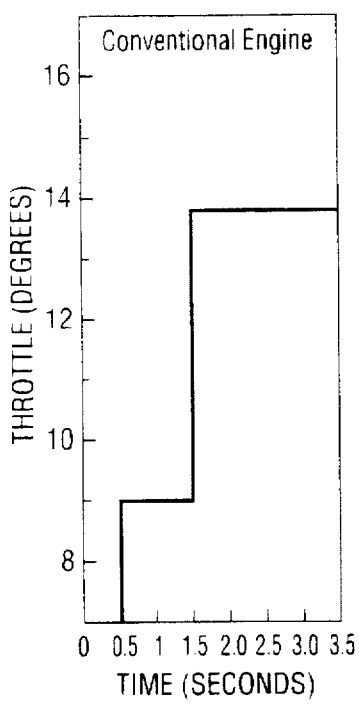
FIGS. 6a–c graphically illustrate sample inputs for throttle position versus time in accordance with a conventional engine (6a), a VCT engine with mechanical throttle (6b), and a VCT engine with electronic throttle control (6c), respectively.
Figure 6B:
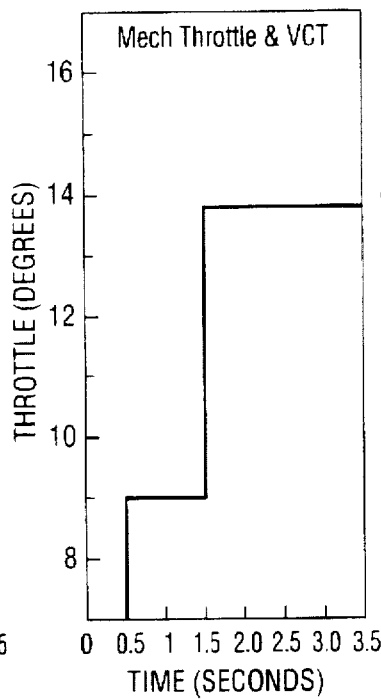
Figure 6C:
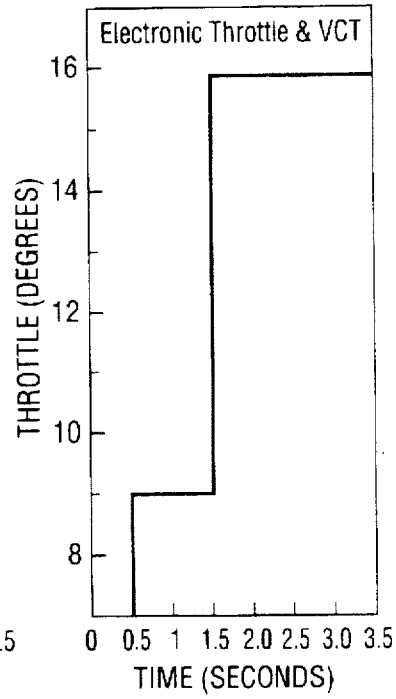
Figure 6D:
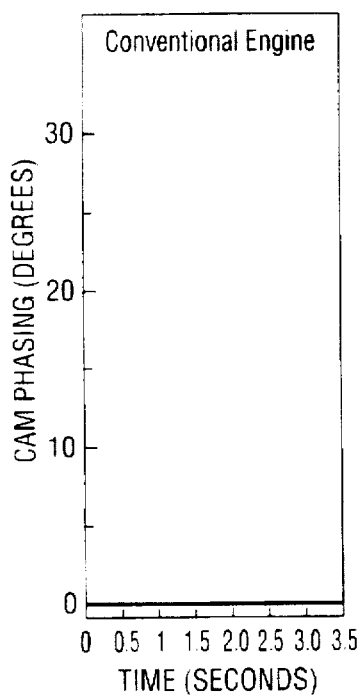
FIGS. 6d–f illustrate sample inputs of cam phasing versus time corresponding with the throttle inputs and engine/throttle configurations of FIGS. 6a–c, respectively.
Figure 6E:
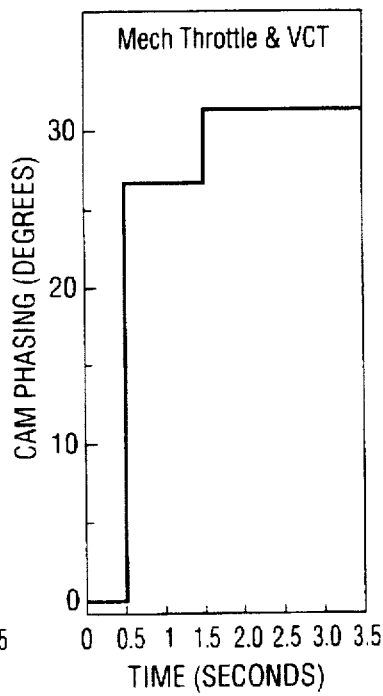
Figure 6F:
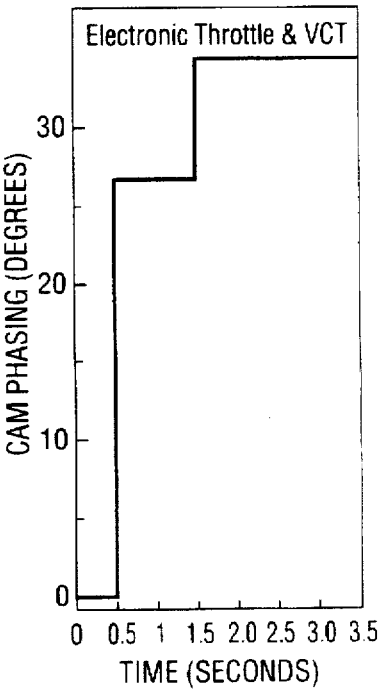
Figure 7A:
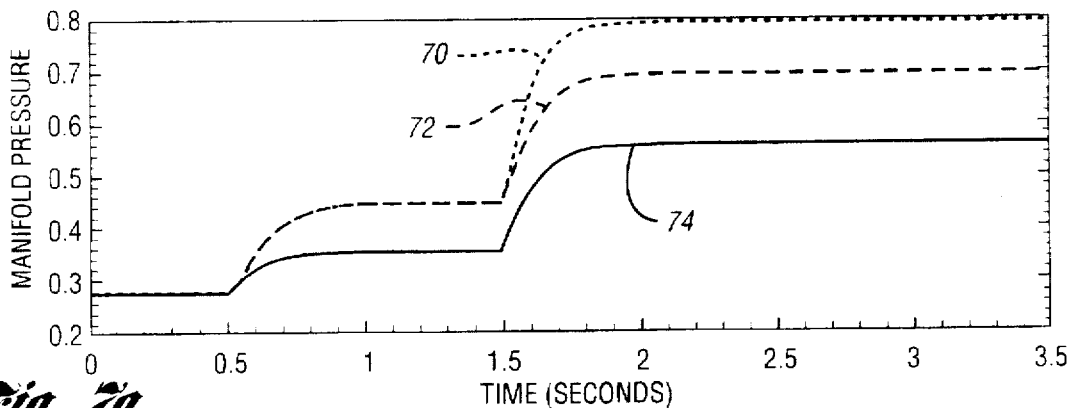
FIG. 7a graphically illustrates manifold pressure versus time in accordance with the inputs of FIGS. 6a–f.
Figure 7B:
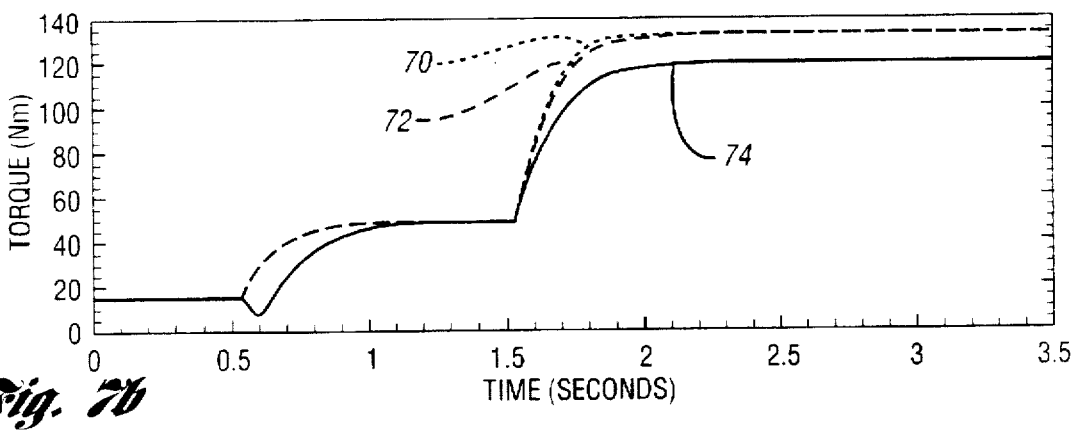
FIG. 7b graphically illustrates torque versus time in accordance with the inputs of FIGS. 6a–f.
Figure 7C:
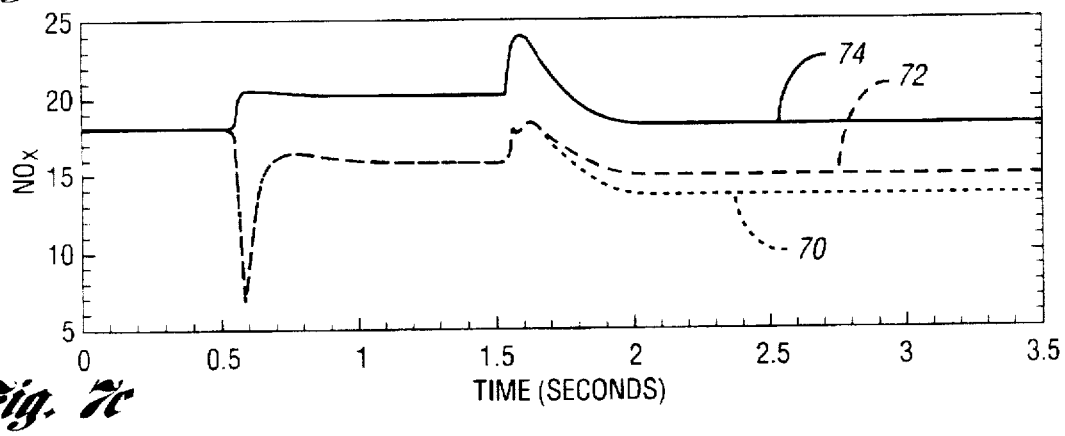
FIG. 7c illustrates $NO_x$ emissions versus time in accordance with the inputs of FIGS. 6a–f.
Figure 7D:
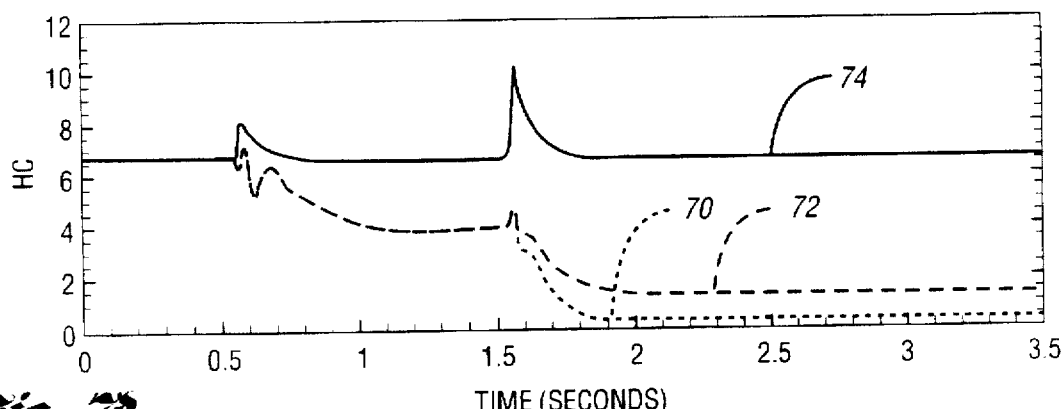
FIG. 7d illustrates HC emissions versus time in accordance with the inputs of FIGS. 6a–f.

Computer simulations of changes in driver torque demands can be used to contrast the new and old cam phasing scheduling schemes. Turning to FIGS. 6a–f, we assume that the driver moves the pedal from 7 degrees to 9 degrees, and then to 14 degrees. This is illustrated in FIG. 6a for a conventional engine, and FIG. 6b for a VCT engine with a mechanical throttle. FIG. 6c shows the throttle setting for a VCT engine with electronic throttle control that corresponds with the same 7° to 9° to 14° pedal movement. Cam phasing versus time is illustrated for the respective engines in FIGS. 6d–f corresponding with inputs of FIGS. 6a–c. Accordingly, the different throttle and cam position settings used in a conventional engine (fixed cam)(FIGS. 6a and 6d), an engine with a VCT mechanism and mechanical throttle control (FIGS. 6b and 6e), and an engine with a VCT mechanism and electronic throttle control in accordance with the present invention (FIGS. 6c and 6f) are shown. Simulation results, using these inputs, are shown in FIGS. 7a–d. As shown, the VCT and electronic throttle control engine (illustrated by the lines indicated as "70" in FIGS. 7a–d), 1) operates at higher manifold pressures, which suggests increased fuel economy, 2) has torque response similar to conventional engine (no steady state error), and 3) achieves significant reduction of the feed gas emissions $NO_x$ and HC in comparison to the conventional (74) and VCT with mechanical throttle (72) schemes.

Figure 8A:
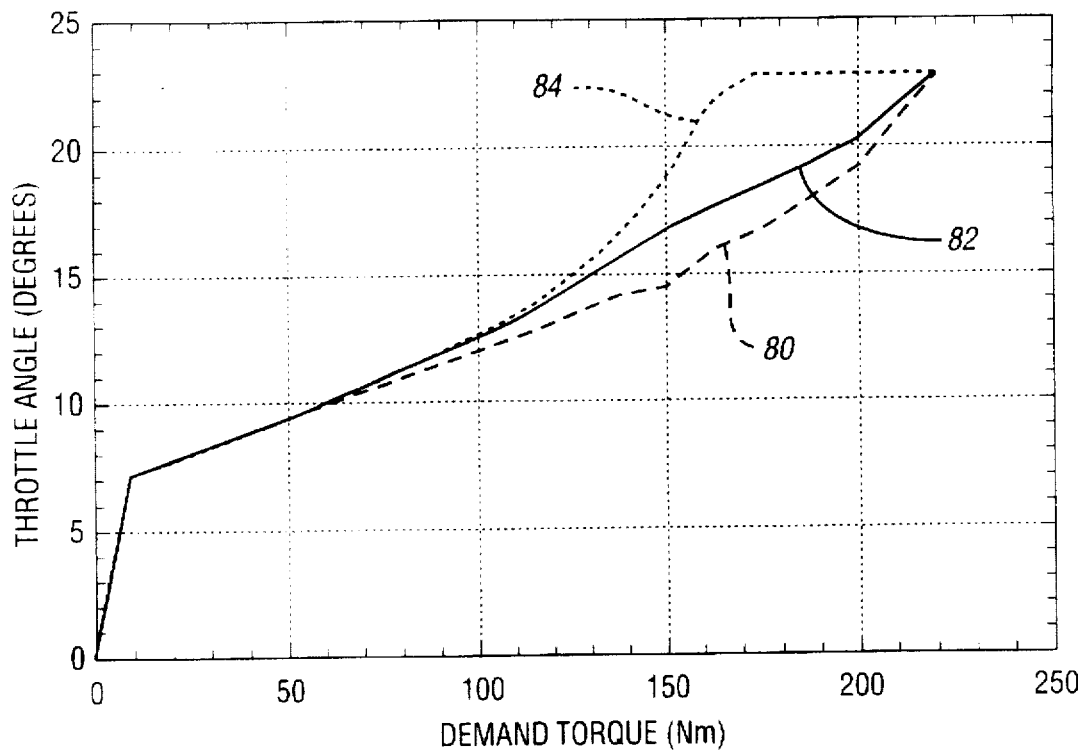
FIG. 8a illustrates throttle angle versus desired torque for the conventional engine, for a VCT engine with a mechanical throttle, and a VCT engine with electronic throttle control in accordance with the present invention.
Figure 8B:
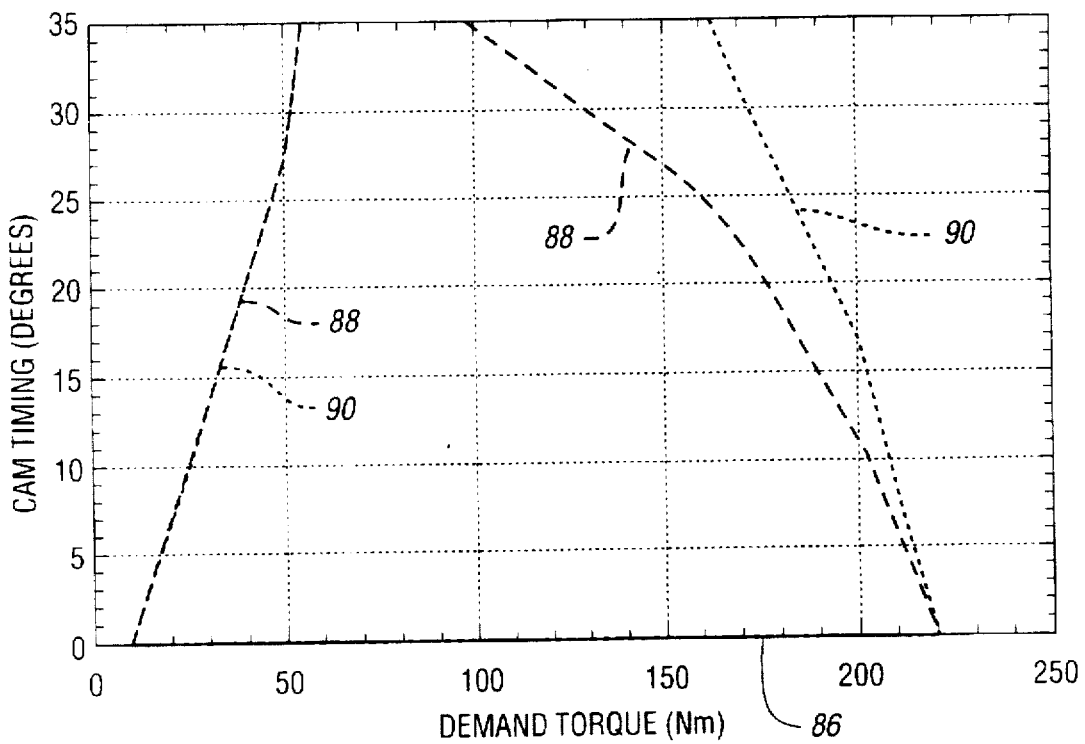
FIG. 8b illustrates cam timing versus desired torque for a conventional engine, a VCT engine with a mechanical throttle, and a VCT engine with electronic throttle control in accordance with the present invention.

Furthermore, the scheduling scheme in accordance with the present invention enlarges the engine operating regime where cam phasing can be retarded, as illustrated in FIGS. 8a and 8b. In FIG. 8a, the conventional engine is illustrated by line 80, the VCT engine with mechanical throttle by line 82, and the VCT engine with electronic throttle control in accordance with the present invention by line 84. In FIG. 8b, the conventional engine is illustrated by line 86, the VCT engine with mechanical throttle is illustrated by line 88, and the VCT engine with electronic throttle control in accordance with the present invention is illustrated by line 90. This ensures feed gas emissions reduction over a wider range of operating conditions. As a result, the static scheduling scheme of the present invention using variable cam timing and electronic throttle control can reduce feed gas emissions and improve fuel economy while maintaining driveability.

Figure 9:
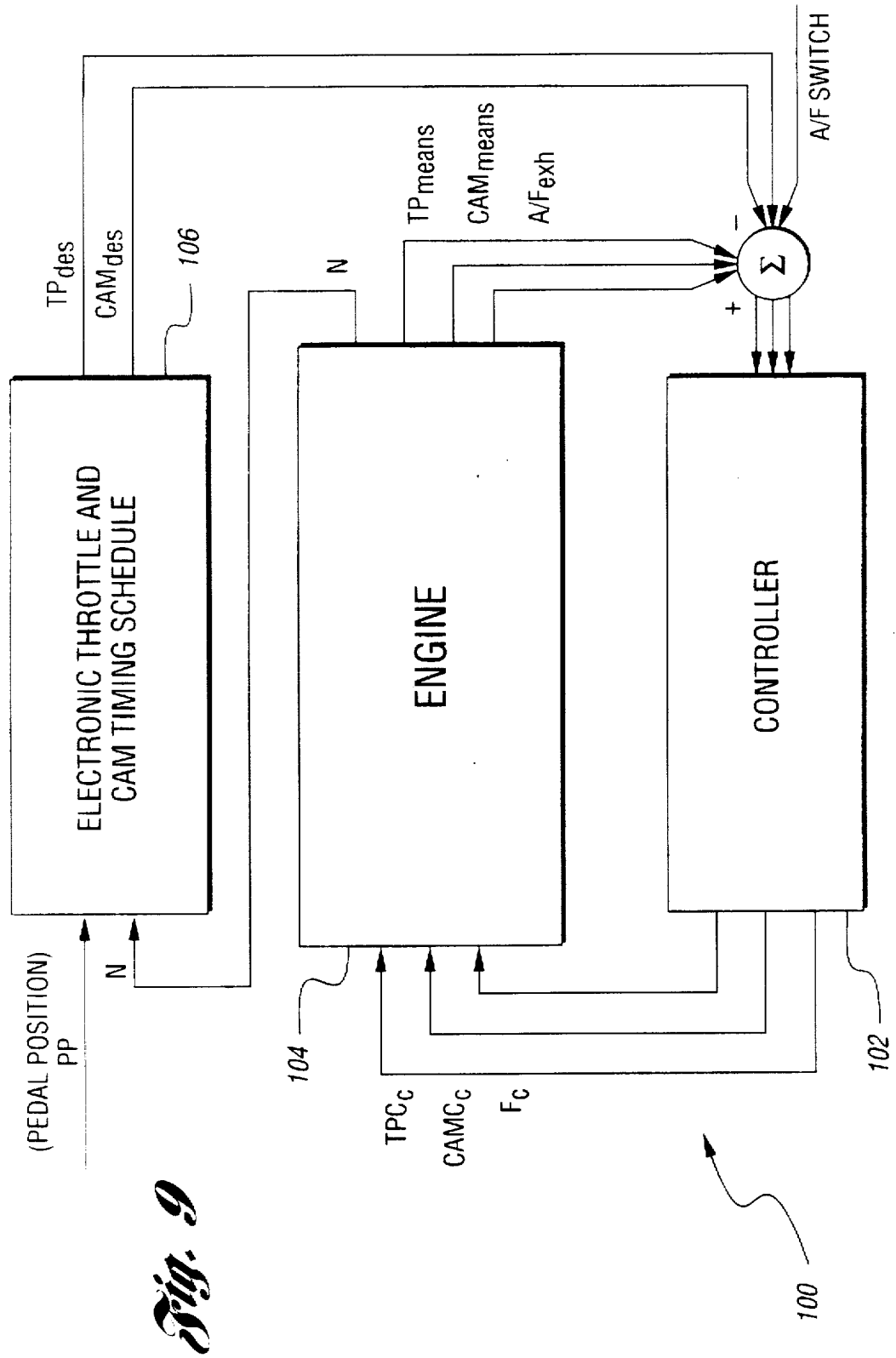
FIG. 9 schematically illustrates an engine control system for use in accordance with the present invention.

FIG. 9 illustrates a typical control system 100 for which the invented scheduling scheme applies. The control system consists of a closed loop controller 102 in communication with the engine 104, as well as an electronic throttle and cam timing schedule 106, such as that illustrated in FIG. 5, which incorporates pedal position and engine speed and outputs desired throttle position and desired cam phasing. The measured throttle position, measured cam position, and measured air/fuel mixture enter the controller 102 and throttle position, cam phasing and fuel supply command signals are sent to the engine 104. The control system may include an air/fuel mixture closed loop control to maintain air/fuel mixture close to stoichiometry in order to ensure minimum tailpipe emissions.

The present invention contemplates that the inlet and exhaust valves could be electronically controlled, as opposed to being cam driven. Accordingly, "variable cam timing" may be termed "variable valve timing" to encompass mechanically and electrically controlled valves.

While the best modes for carrying out the invention have been described in detail, those familiar with the art to which this invention relates will recognize various alternative designs and embodiments for practicing the invention within the scope of the appended claims.

What is claimed is:

1. A method of reducing feed gas emissions and improving fuel economy in an internal combustion engine, comprising:

predetermining ranges of negligible torque demand, small torque demand, moderate torque demand, high torque demand and maximum torque demand;

providing a variable cam timing mechanism in the engine capable of phasing the exhaust and intake valves equally;

providing an electronically controlled throttle in the engine;

determining actual torque demand;

using conventional cam phasing and pedal-to-throttle relationship if actual torque demand corresponds with the negligible torque demand range;

using cam phasing of magnitude in transition between conventional and fully retarded cam phasing and retaining conventional pedal-to-throttle relationship if actual torque demand corresponds with the small torque demand range;

using fully retarded cam phasing and electronically adjusting throttle position to meet actual torque demand if actual torque demand corresponds with the moderate torque demand range;

using cam phasing of magnitude in transition between fully retarded and conventional cam phasing and holding throttle position constant if actual torque corresponds with the high torque demand range; and using conventional cam phasing and pedal-to-throttle relationship if actual torque corresponds with the maximum torque demand range.

2. The method of claim 1 wherein the step of predetermining ranges of negligible torque demand, small torque demand, moderate torque demand, high torque demand and maximum torque demand further comprises incorporating engine speed.

3. A method of reducing feed gas emissions and improving fuel economy in an internal combustion engine, comprising:

predetermining ranges of negligible torque demand, small torque demand, moderate torque demand, high torque demand and maximum torque demand;

providing a variable valve timing mechanism in the engine capable of phasing the intake valve independently;

providing an electronically controlled throttle in the engine;

determining actual torque demand;

using conventional intake valve phasing and pedal-to-throttle relationship if actual torque demand corresponds with the negligible torque demand range;

using intake valve phasing of magnitude in transition between conventional and fully advanced intake valve phasing and retaining conventional pedal-to-throttle relationship if actual torque demand corresponds with the small torque demand range;

using fully advanced intake valve phasing and electronically adjusting throttle position to meet actual torque demand if actual torque demand corresponds with the moderate torque demand range;

using intake valve phasing of magnitude in transition between fully advanced and conventional intake valve phasing and holding throttle position constant if actual torque corresponds with the high torque demand range; and using conventional intake valve phasing and pedal-to-throttle relationship if actual torque corresponds with the maximum torque demand range.

4. The method of claim 3 wherein the step of predetermining ranges of negligible torque demand, small torque demand, moderate torque demand, high torque demand and maximum torque demand further comprises incorporating engine speed.

5. A method of reducing feed gas emissions and improving fuel economy in an internal combustion engine, comprising:

predetermining ranges of negligible torque demand, small torque demand, moderate torque demand, high torque demand and maximum torque demand;

providing a variable valve timing mechanism in the engine capable of phasing the exhaust valve independently;

providing an electronically controlled throttle in the engine;

determining actual torque demand;

using conventional exhaust valve phasing and pedal-to-throttle relationship if actual torque demand corresponds with the negligible torque demand range;

using exhaust valve phasing of magnitude in transition between conventional and fully retarded exhaust valve phasing and retaining conventional pedal-to-throttle relationship if actual torque demand corresponds with the small torque demand range;

using fully retarded exhaust valve phasing and electronically adjusting throttle position to meet actual torque demand if actual torque demand corresponds with the moderate torque demand range;

using exhaust valve phasing of magnitude in transition between fully retarded and conventional exhaust valve phasing and holding throttle position constant if actual torque corresponds with the high torque demand range; and using conventional exhaust valve phasing and pedal-to-throttle relationship if actual torque corresponds with the maximum torque demand range.

6. The method of claim 5 wherein the step of predetermining ranges of negligible torque demand, small torque demand, moderate torque demand, high torque demand and maximum torque demand further comprises incorporating engine speed.

* * * * *